3,339,198
TERRAIN CLEARANCE MEASURING SYSTEM AND METHOD
Keith C. M. Glegg, Montreal, Quebec, Canada, assignor to Canadian Marconi Company, Montreal, Quebec, Canada
Filed Sept. 3, 1965, Ser. No. 485,023
9 Claims. (Cl. 343—14)

ABSTRACT OF THE DISCLOSURE

An FM/CW radar terrain clearance meter wherein an unmodulated echo signal is mixed with an unmodulated transmitted signal and the $J_0$ component is selected and attenuated to not less than 60% of the maximum value. An FM modulated signal is similarly mixed and the $J_0$ component resulting is compared to the attenuated $J_0$ component of the unmodulated signal. The modulation index of the modulated signal is then adjusted so that the attenuated unmodulated $J_0$ component and the unattenuated modulated $J_0$ component will be equal.

---

This invention is concerned with wave echo ranging systems and is particularly directed to terrain clearance measuring systems or so-called radar altimeters for use on aircraft to provide an accurate measurement of height above ground during landing, take-off, hovering and low level operations of fixed and rotary wing craft.

To overcome the problem of exceedingly high modulation rates which low level operation imposes on conventional pulsed and frequency modulated radar altimeters, systems have been developed based upon the known technique comprising the transmission of a frequency modulated signal, the mixing of the returned echo with an undelayed signal derived internally of the system from the transmitter, and the selection and examination of a predetermined frequency modulation sideband component resultant from said mixing. Hereinafter in this specification systems based on the use of this technique will be termed sideband selecting FM/CW systems.

A number of aspects of the results obtainable from the above procedure are discussed in my United States Patent No. 2,935,743 and in my Canadian Patent No. 606,650. From reference to said patents it may readily be shown that when a frequency modulated signal of the form $$\cos [\omega_c t + p \cos \omega_m t] \quad (1)$$

is mixed with its time delayed counterpart.

$$\cos [\omega_c(t+T) + p \cos \omega_m(t+T)] \quad (2)$$

a signal product of the form $$\cos [\omega_c T - 2p \sin \omega_m T/2 . \sin \omega_m(t+T)] \quad (3)$$

is produced where the terms are defined as follows:

$\omega_c = 2\pi$ times the carrier frequency $f_c$
$\omega_m = 2\pi$ times the modulation frequency $f_m$
$p$ = modulation index applied to carrier signal
$= \Delta f_c / f_m$ where $\Delta f_c$ is the carrier deviation
$t$ = time
$T$ = time delay It will be seen that the signal represented by (3) is itself a frequency modulated signal having an effective modulation index of $2p \sin \omega_m T/2$, a function of the delay time T, and is resolvable into a plurality of frequency modulation sideband components $J_0$, $J_1$, $J_2$ ... etc., in accordance with the well known Bessel function analysis of the frequency spectrum distribution of a frequency modulated wave. Further, if (1) represents the signal transmitted to earth from an airborne radar and (2) represents the returned echo signal, T is a measurement of height. An examination of the signal (3), therefore, makes possible a determination of heights. More specifically, the amplitude of each sideband component varies as a function of the effective modulation index and hence of height.

It is to be noted that in (3) the carrier frequency or $J_0$ component of the echo signal is represented by $\omega_c T$, a direct current term. Since in the mixing process there are a number of other direct current terms produced, the $J_0$ term of (3) is normally not distinguishable therefrom. Should the echo signal bear a Doppler frequency shift $f_d$, however, the expression (3) may be re-written to omit the direct current components, and is found to be $$\cos [\omega_d t - 2p \sin \omega_m T/2 . \sin \omega_m t] \quad (4)$$

As explained in my United States Patent 2,935,743 the Doppler frequency signals appear physically as a pair of signals straddling in the spectrum the location of each sideband and component frequency and are of amplitude corresponding to the nominal amplitude of the associated sideband.

One presently known sideband selecting FM/CW radar altimeter selects the Doppler shifted signals associated with one of the lower order sidebands, of which $J_1$ is preferable in theory as having an amplitude characteristic which, over the lower range of heights, very nearly compensates for the normal inverse square law of distance and so is invariable with height, so processes them to obtain a signal or frequency $f_m$ (or multiple thereof) equal to the modulation frequency but having a phase dependent on height, and by phase comparison with the modulating signal obtains a measurement of height.

Another presently known sideband selecting FM/CW radar altimeter selects the echo signal components associated with the second order, or $J_2$, sideband and so adjusts the deviation applied to the transmitter as to maintain these components at a maximum. Since the maximum of the $J_2$ components occurs at an effective modulation index of given value known from the mathematical tabulations of Bessel functions, the applied deviation to obtain this value is a measure of height.

The first of the foregoing known systems has been briefly discussed because it is a frequency modulation system using a selected frequency modulation sideband component and taking advantage of certain of the frequency modulation echo signal versus distance characteristics set forth in my abovementioned United States Patent 2,935,743 and Canadian Patent 606,650. It thus has certain features in common with the second above-noted system and, as will be seen later, with my present invention to be described below. However, the said first system is basically a phase comparison system which, if it is to give accurate measurement over a range of heights, must be capable of resolving phase differences of fractions of a degree. The problems of achieving very precise phase measurement may be eased by the use of more than one modulating frequency but ambiguities then become inherent in the system.

The second of the abovenoted known systems, which serves the applied deviation to track the echo signal on the maximum of the $J_2$ component, is more closely related in its operation to that of my present invention than is the first. The measurement involved in this second system is that of the frequency deviation of the transmitter carrier. Since microwave tubes such as klystrons of the type in general use for airborne navigational radars are available which have a substantially linear frequency versus modulation signal amplitude characteristic over at least a limited range, the measurement in theory simply resolves to one of determining the amplitude of the modulating signal producing the frequency deviation, a relatively simple and direct procedure. In practice it is limited by the extent to which the frequency of the transmitter may be swung in a linear fashion.

However, as will be more thoroughly discussed later, the second known system has certain drawbacks inherent in the fact that it operates using a sideband component, usually the second order, or $J_2$ sideband component, of the altitude modulation signal. Such drawbacks include the facts that tracking at any sideband peak is ambiguous in that maxima occur at a plurality of modulation indices; tracking at an amplitude peak lacks precision in that the peaks are not sharply defined but are rounded; and, for low heights, the required frequency deviation to achieve the necessary effective modulation index tends to exceed the linear range of frequency swing readily obtainable from available transmitter tubes.

My present invention aims at overcoming the abovenoted drawbacks of prior art frequency modulated low level radar altimeters by utilizing, instead of a predetermined *sideband* component of the echo signal, such as $J_2$, the *carrier* frequency or $J_0$ frequency modulation echo signal component. The use of the carrier of $J_0$ component provides advantages unobtainable from the use of sideband components, a fact which, to applicant's knowledge, has not been recognized in the prior art.

In accordance with the invention I provide a method for operating a radar terrain clearance meter of the sideband selecting frequency modulated continuous wave type wherein earth returned echo signals are applied to a product type mixer together with signals derived internally of the apparatus from the transmitter said method comprising, frequency selecting from the output of the mixer a component representative of the zero order component of the echo signal frequency modulation spectrum components adjusting the modulation index applied to the transmitter signal to that value whereat the signal energy in said zero order component of the echo signal is so dispersed into sideband components that the amplitude of said zero order component falls to a predetermined fraction of the amplitude thereof under conditions of no applied frequency modulation, and indicating the value of said adjusted modulation index in terms of distance.

As used in this specification the term "zero order component of the echo signal" applies to a signal which is distinguishable from the zero order component of the transmitter signal and may be, and normally is, in the operation of the invention, located in a different part of the spectrum. Of course applies not only to this signal as it appears at the output of the first mixer but to those signals derived therefrom by such processes as further heterodyne mixing, detection, frequency translation and so forth.

In those cases of operational use wherein there is relative movement between the aircraft and the earth's surface, which is almost always the case even with a nominally stationary hovering helicopter, the echo signal will bear a Doppler frequency shift whereby the $J_0$ component thereof may be distinguished from the $J_0$ products produced by the transmitter direct and leakage signal which find their way into the mixer internally of the system.

It is not necessary, however, in the operation of the invention that the echo signals bear a Doppler frequency shift since the $J_0$ component of the echo signal, the use of which characterizes this invention, may be obtained by the use of an additional frequency modulation applied to the transmitted signal. As will be explained hereafter the use of this additional frequency modulation enables the achievement of some particularly desirable operational characteristics.

The invention will be more particularly described and explained with reference to the accompanying drawings in which.

Referring again to the expression (3) above, $$\cos\ [\omega_c T - 2p \sin \omega_m T/2 \cdot \sin \omega_m(t+T)]$$

the effective modulation index, $MI_{eff}$, by virtue of the fact that the delay T in radar altimeters equals $2h/c$ where $h$ is height and $c$ is the velocity of electromagnetic waves in space, may be written $$MI_{eff} = 2 \cdot \Delta f_c / f_m \cdot \sin \omega_m h / c \qquad (5)$$

Now, radar altimeters of the type here under consideration use a modulation frequency $f_m$ of such value that for the lower range of operational heights $\sin \omega_m$ may be taken as being simply $\omega_m$. If this is done with respect to expression (5) and $c$ is expressed in numerical terms, expression (5) becomes $$MI_{eff} = \Delta f_c \cdot h / 78 \qquad (6)$$

where "$\Delta f_c$" is in megacycles per second and "$h$" is in feet.

Figure 1:
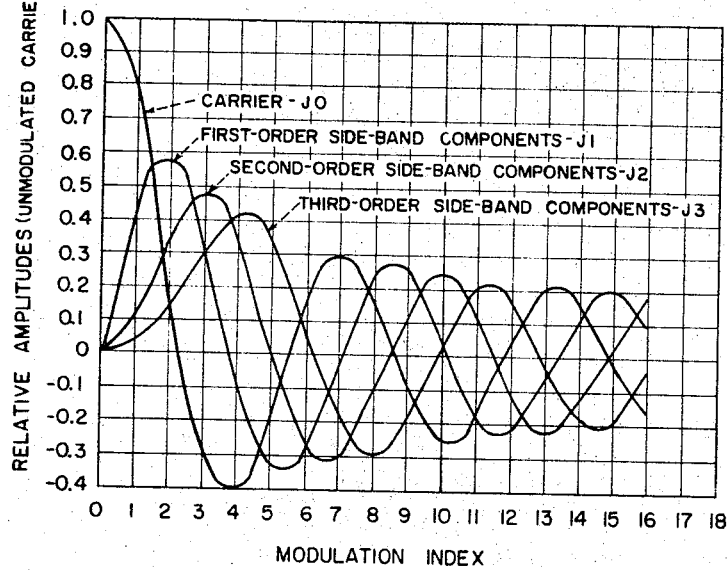
FIGURE 1 is a diagram showing the response of various frequency modulation sideband components as a function of modulation index.

Consider now the operation of the abovenoted second type of known sideband selecting FM/CW radar altimeters with reference to FIGURE 1 of the drawings. As stated, the second order sideband of the echo signal, $J_2$, is selected and the frequency deviation, or $\Delta f_c$, of this system is continually adjusted to maintain $J_2$ at a maximum, that is, the effective modulation index is maintained (as closely as possible) at the value 3.1 by adjustment of the frequency deviation. This means a systems constant of $h=242$ feet per megacycle deviation.

Some of the drawbacks inherent in this known system will now be apparent. If inadvertently the system should lock on to the second peak of $J_2$ (with an effective modulation index of 6.7), say because of a momentary interruption, the indicated height would be double that of the actual height. This, of course, could be disastrous in an altimeter, and special means must be taken to ensure that such could not happen.

Secondly, it will be seen that the peak of $J_2$ is rounded whereby it is difficult with practical apparatus to locate its maximum with precision, particularly in the presence of noise.

Thirdly, the required frequency deviation for the measurement of low heights is large—some 80 megacycles per second for a height of 3 feet, which height is of interest in landing operations. Such deviations with the desired linearity are attainable with difficulty in the present state of the art.

A fourth drawback relates to the signal level versus distance characteristics of signals in a frequency modulated system such as this which leads to the adoption in this system of the $J_2$ sideband. To enable operation up to an acceptable upper limit of height the frequency of modulation is limited in practice to some few tens of kilocycles per second at most and thus the second harmonic thereof, the frequency of the $J_2$ component, is well within the spectrum of noise modulation components—which extend to many tens of kilocycles from carrier frequency present in the leakage signals reaching the microwave mixer from vibrating elements of the antenna and waveguide system after not insignificant time delays. These leakage signals, by virtue of their time delays, just as is the case for true echoes, will have effective modulation indices which are functions of the extent to which they bear deviations of the carrier frequency, and of their time delay in reaching the mixer. Reference now to FIG- URE 1 will explain the selection in the prior art of the $J_2$ sideband for operation. As noted before $J_2$ operation imposes the use of an already uncomfortably large frequency deviation; if $J_3$ operation were used this deviation would perforce increase in the ratio of the two peak modulation indices, 4.2 to 3.1 or to 1.35 times. Suppose, on the other hand that the $J_1$ sideband were to be used, and that, for purposes of illustration only, the leakage signals had an effective modulation index of 1 near the frequency $2f_m$ of the $J_2$ component. Neglecting the inverse square law of signal amplitude with range which applies in both cases, the signal to noise ratio for $J_1$ operation, instead of being approximately 5 to 1 for $J_2$ operation would now be only some 1.3 to 1 and this only on the assumption that the noise $2f_m$ removed from the carrier for the $J_2$ case was as great as the noise only $f_m$ removed from the carrier in the $J_1$ case.

This assumption of an equal amplitude noise spectrum is valid at best over only a limited range of frequencies. In actual operation leakage noise at frequency $f_m$ in the spectrum can normally be expected to be much greater than at double that frequency removed from the carrier so that it is evident that the use of the $J_2$ sideband results in a great improvement in signal to noise performance over the use of the $J_1$ sideband.

However, as noted before, in airborne radar apparatus the noise frequency spectrum extends to many tens of kilocycles from the carrier. Obviously from the foregoing if a much higher modulation frequency could be used, or if a higher order sideband could be used, or both, even greater signal to noise performance could be attained. By the use of the present invention this can be effected as will be shown below.

Returning now to a consideration of the first three drawbacks of this known system as outlined above, assume that it is possible to obtain from the output of the mixer the zero order or $J_0$ frequency modulation sideband component of the echo signal despite the fact that, according to expression (3) this is a direct current component inextricably mixed with all the other direct current demodulation components of the internal signals of the system or, in accordance with expression (4), it is a component of Doppler shift frequency and thus, from the first foregoing discussion on the signal to noise characteristics of the known $J_2$ system, inextricably mixed with the noise of the leakage signals.

To repeat, let us assume that the $J_0$ component of the echo signal is obtainable—how this can be done will be described later—and consider again FIGURE 1 with reference in particular to the curve of $J_0$ as compared to the curves of the various sidebands, in particular $J_2$. It will first be observed that $J_0$ is unique; it is the only curve that has a value other than zero at zero effective modulation index, and is the only curve that starts to decrease instead of increase with an increase from zero of the effective modulation index.

In operating our system let us measure the amplitude of the carrier frequency or $J_0$ component of the echo signal without any modulation applied to the transmitter and then apply frequency modulation to the receiver in increasing degree until the amplitude of the echo signal $J_0$ component falls to a given amount. If, for example, we reduce the amplitude to .77 we know that the effective modulation index is 1. If we so increase modulation as to reach zero response we know that the effective modulation index is 2.405. It is not necessary to know the frequency of applied modulation to do so. What we have done is to disperse the energy of the carrier frequency signals into sidebands which are disregarded—no frequency selection nor amplitude measurement of the sidebands is basically necessary. As seen from expression (6) all that is needed to be known is $\Delta f_c$, a value which can be obtained by calibration of the frequency shift versus modulation signal amplitude characteristic of the transmitter whereby a measurement of the amplitude of the applied modulation signal provides $\Delta f_c$ and hence from expression (6) the value of height. Indeed, a multiple frequency signal can be used to disperse the carrier frequency energy into sidebands in accordance with the present invention, but it must be kept in mind that expression (6) only applies where the highest modulation signal frequency is such that the valve of $\omega_m T/2$ is not appreciably greater than 1 radian. Operation to a height whereat $\omega_m T/2$ equals $\pi/2$ radians, is of course, possible by applying expression (5) wherein the actual sine wave dependency of echo signal amplitude is taken into consideration.

First, consider so modulating the transmitter that the $J_0$ component of the echo signal falls to, say, 77% of its unmodulated value. The value 77% is convenient, but any value above 40% may be used in this mode of operation since it will be seen that within this range the effective modulation index is unambiguous—one and only one value of modulation index is possible. Additionally, the slope of $J_0$ from, say 95% to 40% response is high, that is, the rate of change of amplitude with effective modulation index is quite rapid so that adjustment of effective modulation index by adjustment of carrier deviation is quite precise. Contrast this with the lack of precision in tracking on the peak of $J_2$.

A preferred method of operation in accordance with the above adjustment of effective modulation index is to insert in the echo signal path an attenuator adapted to reduce the signal under conditions of no modulation by 23% and then to remove the attenuation and adjust the modulation index to obtain this same signal level. The signal delivered through the system therefore does not change in level and a repetitive sequence of these operations may be set up wherein the only effect observable on the delivered signal is a lowering in level of about 1 decibel. This aspect of this operation of the invention is of importance when the invention is used in association with, and sharing the same echo signal with, a Doppler navigational radar or Doppler sensor as will be discussed later.

On the other hand, using a tracking technique similar to that used in the noted prior art system tracking on the peak of $J_2$, this invention may be practised by tracking on the first zero cross-over of $J_0$ at the effective modulation index of 2.4. Thus the effective modulation index may be increased from zero until the amplitude of the $J_0$ component of the echo signal stops falling and starts to rise. As will be seen from FIGURE 1 this point is extremely sharply defined, and if the signal to noise ratio is adequate this technique is capable of extremely high precision. One drawback is, of course, that height finding cannot be combined with other uses of the echo signal except on a time sharing basis.

With regard to the question as to how the $J_0$ component of the echo signal produced by the mixer is to be selected, it has been pointed out that if there is radial movement between the radar system and the earth the mixer output instead of being given by the expression (3)

$$\cos[\omega_c T - 2P \sin \omega_m T/2 \cdot \sin \omega_m(t+T)]$$

where the $J_0$ term is $\omega_c T$, a direct current which combines with the direct current terms of the mixing of signals internal in the radar, the echo signal is now given by the expression (4)

$$\cos [\omega_d t - 2p \sin \omega_m T/2 \cdot \sin \omega_m t]$$

where the $J_0$ component is now displaced from zero frequency by the Doppler frequency shift $f_d$.

In actual use of aircraft altimeters, even with hovering helicopters, there is always some relative movement with respect to earth whereby the $J_0$ component of the echo signal is selectable by a simple form of AC coupling. Now, it will be apparent to those skilled in the art of airborne radar navigational apparatus that with operation as just outlined, at low speeds at least, the echo signal $J_0$ component will fall into that part of the spectrum occupied by the noise modulated leakage signal products also produced by the mixer. Evidently, then, this type of operation will normally be practicable only at low altitudes whereat the desired echo signals are relatively large as compared to the leakage signals. However, there is one type of aircraft operation where this condition holds and is of sufficient importance to justify instrumentation for such purpose only, namely, the blind landing or touch-down procedure of winged aircraft.

Figure 2:
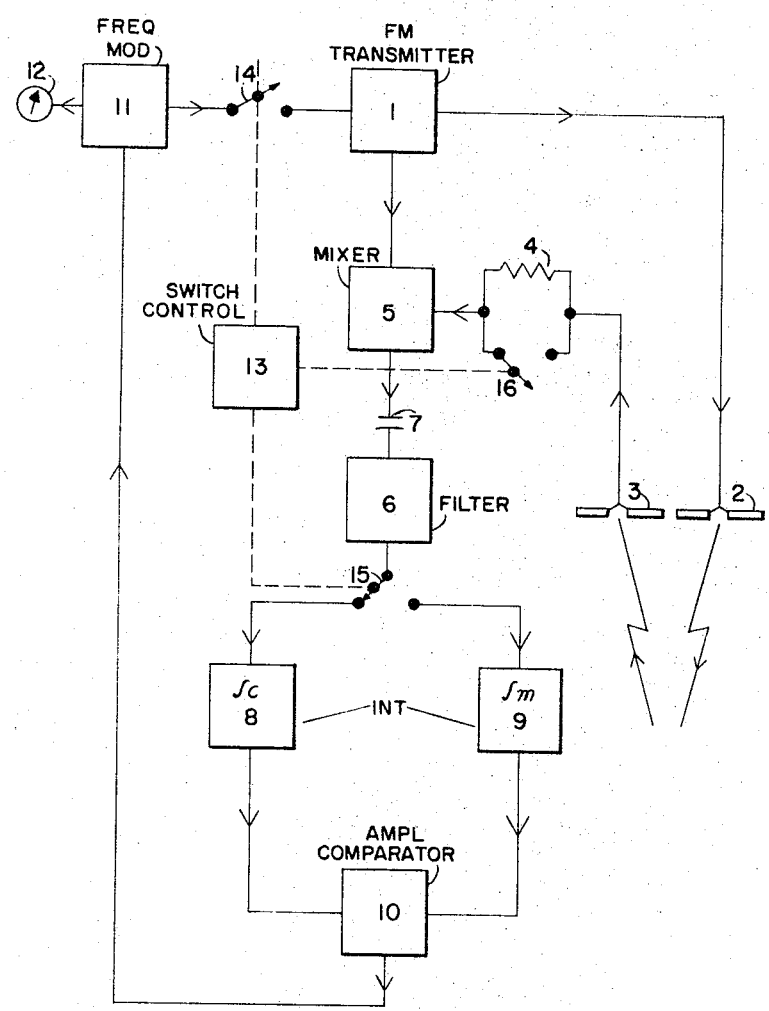
FIGURE 2 shows in elementary form one embodiment of the invention.

The present invention provides a notably simple, reliable and straightforward means for providing blind landing instrumentation. FIGURE 2 shows in block diagram form an embodiment of the invention adapted for such service. In FIGURE 2 a frequency modulatable transmitter 1 delivers a carrier signal to the transmitting aerial 2 which radiates a signal to the ground which, upon reflection returns as an echo to receiving aerial 3 and is delivered via a switchable attenuator 4 to the mixer 5 to which is also applied a portion of the carrier signal direct from transmitter 1. From the output of the mixer 5 a low pass filter 6 fed from DC blocking means 7 delivers a predetermined band of low frequency signals alternately to one and the other of a pair of integrators 8 or 9, labelled respectively $f_c$ for carrier operation and $f_m$ for operation under modulation. The outputs from integrators 8 and 9 are compared in the amplitude comparator 10 whose output, indicative of any difference in signal level applied to the two integrators is applied to control the frequency deviation of a frequency modulator 11. The deviation applied by modulator 11 to the transmitter 1 is indicated by indicator 12. Switching control means 13 repetitively operates switches 14, 15 and 16; first as shown to operate transmitter 1 without modulation, insert attenuator 4 in the echo signal path, and apply the mixer output to integrator 8; and second, to frequency modulate transmitter 1 by applying thereto the output of modulator 11, remove the attenuation of attenuator 4 from the echo signal path, and apply the mixer output to the other integrator 9.

In FIGURE 2 the aerials 2 and 3 have been indicated as being dipoles, a form of aerial having very limited directivity characteristics, to illustrate a significant operating feature of this embodiment of the invention. During the landing procedure of a winged aircraft the Doppler frequency shift carried on each of the multitudes of rays of the returned beam will be different due to their different angles of incidence with the earth's surface with the result that there is a wide dispersion of the echo signal through the frequency spectrum. However, even at a known fixed groundspeed no one Doppler frequency is representative of a single ray, but is the result of all rays on the surface of a given cone, and hence, of course, from rays of different lengths. But those rays which, no matter how the aircraft's attitude may vary, occupy that plane which is vertical and at right angles to the ground track will have a very low Doppler frequency shift, and of these rays the one which is vertical, and hence is shortest, will contribute the greatest amount to the echo signal. Hence in the embodiment of the invention shown in FIGURE 2 the filter 6 is preferably designed to pass a narrow band of signals not far removed from zero frequency and hence to provide a response representative of the vertical ray.

A further and related aspect of the embodiment of FIGURE 2 is that the contribution of the precisely vertical ray may be enhanced by the use of a relatively low carrier frequency for the transmitter. Thus, if instead of using a carrier frequency of some 4,000 to 15,000 megacycles per second as is the usual practice with airborne radar navigational devices a frequency of a few hundred megacycles per second is employed, the characteristic of the earth's surface as a reflector—the paved airport runway in this case—becomes essentially specular rather than dispersive and the echo signal is composed to a large degree of only the energy in the vertical component of the beam.

Some of the advantages of the embodiment of the invention illustrated in FIGURE 2 are as follows: the frequency of the frequency modulator need not be precisely known or maintained constant; frequency selection of the desired output of the mixer is at audio frequency, independent of the modulator frequency, and thus does not involve the use of IF amplification and second detection; the transmitter may comprise only a grid controlled vacuum tube or a transistor costing one order of magnitude less than the usual microwave device such as a klystron; the aerial system can be, and preferably is, of a most simple type having broad directivity; and mechanical vibrations which in a microwave system cause very significant phase displacements resulting in frequency modulation noise here cause phase displacement one or more orders of magnitude less.

It might be noted that, in addition to selecting the attenuator insertion loss, in accordance with the teachings given in the preceding discussion, to be less than 60% to avoid ambiguity in the value of the effective modulation index, the frequency of modulation should be chosen to be sufficiently high that the Doppler frequency components of the first order or $J_1$ echo signal sideband do not, at the highest operating speed, extend with significant amplitude toward zero frequency to be accepted by the filter 6. Since this is a low level system the altitude restriction on the maximum modulation frequency is not of significance here.

Figure 3:
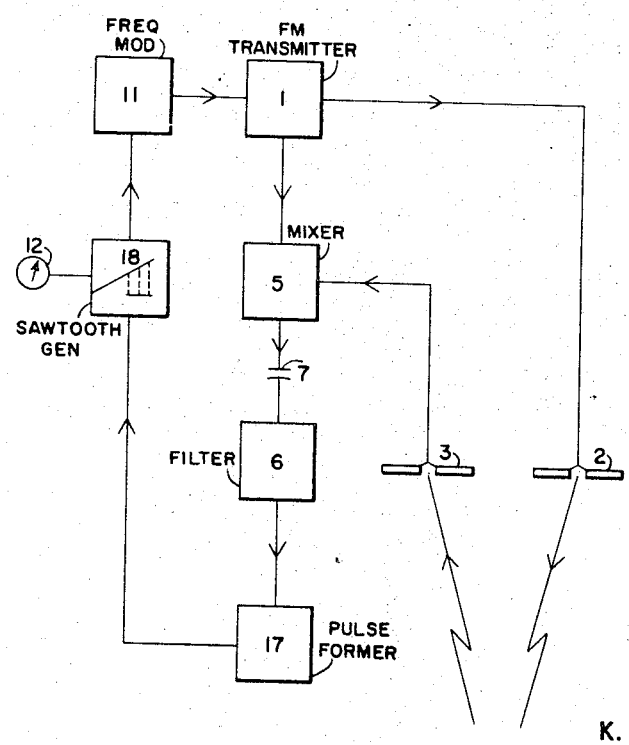
FIGURE 3 shows a modification of the embodiment of FIGURE 2.

FIGURE 3 shows a modification of the embodiment shown in FIGURE 2 wherein instead of dispersing 23%, say, of the carrier into the sidebands, the deviation is adjusted to disperse 100% of the carrier into the sidebands to obtain an effective modulation index of 2.4 as discussed previously. Those elements of the embodiment of FIGURE 3 corresponding to those of FIGURE 2 are identified in like manner; those elements that differ are believed to be obvious from the figure, and so it is believed sufficient to describe only briefly the operation of FIGURE 3.

A repetitive sawtooth generator 18 applies increasing energization to modulator 11 whereby the frequency deviation of transmitter 1 is increased from zero. A pulse former 17, fed from filter 6 develops a pulse when the signal applied thereto ceases to fall and starts to rise. This pulse is applied to the sawtooth generator 18 to stop its sweep and to initiate a new cycle. The peak amplitude of the sweep is indicated on the indicator 12, calibrated in terms of height. Since suitable circuitry for the elements broadly designated as pulse former 17 and sawtooth generator 18 are well known to those skilled in the art, their selection is a matter of discretion with the individual designer of a system in accordance with the embodiment of the invention shown in FIGURE 3, and are not per se specific to the invention, further discussion of these elements is unnecessary.

The embodiments of the invention so far discussed make use of the $J_0$ component of an echo signal in the form (4)

$$\cos [\omega_d t + 2p \sin \omega_m T/2 . \sin \omega_m t]$$

and, as will be evident to those skilled in the art, are applicable to operations where there is inherently a favourable signal to noise ratio which means, in general though not necessarily low altitude operation. A general purpose altimeter system, however, should be capable of operation over a considerable range of heights and hence with echo signals that are small compared to the components of noise modulation on the leakage signals which may extend with appreciable amplitude to many tens of kilocycles on each side of the carrier. This problem has been attacked in the prior art sideband selecting FM/CW altimeters discussed above by using the second order of $J_2$ sideband. At a maximum altitude of, say, 10,000 feet the maximum frequency of modulation is limited to the order of 20,000 cycles per second with the result that the $J_2$ sideband is located in the spectrum at no more than 40,000 cycles per second from the carrier, and hence still within the noise spectrum.

The present invention, however, using the $J_0$ component of the echo signal with its attendant advantages, is applicable to an altimeter system in which this noise problem is overcome. What is done according to this aspect of the invention is, in a sideband selecting FM/CW system of the type discussed, to first modulate the carrier in such a manner that a predetermined sideband component of the echo signal located in the output spectrum of the mixer at a point removed from noise modulation components, and to use this sideband component as borne by the echo signal as the $J_0$ component of the echo signal. Now, by applying an additional and deviation controlled altitude frequency modulation, the energy of this selected echo signal component is itself dispersed into sidebands until its amplitude falls to a predetermined level.

The first mentioned modulation may be amplitude modulation or frequency modulation. If amplitude modulation is used the echo component of the mixer output will have to be selected by virtue of the fact that it differs from the signal component of first modulation frequency derived directly from the transmitter by virtue of a Doppler frequency shift. It might be well to point out here that this mode of operation is not the same as that sometimes used in prior art systems where a frequency shift is applied to that transmitter signal which is fed into the mixer; in this known latter case, while the transmitter signal may be re-located in the spectrum at a point which is not harmonically related to the modulation frequency and whereby positive and negative Doppler frequency shifts are distinguishable, the shifted transmitter signal carries with it all its bands of noise modulation.

It will be apparent to those skilled in the art that a system in accordance with the invention using amplitude modulation as the first modulation produces an echo signal of the same type as that of the embodiments of FIGURES 2 and 3 except that the Doppler shifted echo signal, expressed by $$\cos [_dt + 2p \sin_m T/2 . \sin_m t]$$

has been split and shifted in frequency to straddle the modulation frequency. While such a mode of operation is possible and in some cases desirable, the first modulation frequency $J_0$ component of the directly fed, or leakage, transmitter signal is present in the mixer output and must be distinguished from the Doppler shifted echo signal by frequency selection.

It is generally preferred, therefore, to use double frequency modulation; not only, assuming pure frequency modulation, will there be only echo signal components in the selected output of the mixer, but the first modulation may be selected and/or adjusted to provide a desired height versus amplitude characteristic for discrimination against leakage signal noise at heights where the echo signal level is low as shown in my United States Patent 2,935,743. Of very great practical importance, too is the fact that the output signal delivered by sideband selecting FM/CW Doppler navigational radar groundspeed sensors is precisely that signal which, in a double frequency modulated altimeter in accordance with the present invention, constitutes the $J_0$ component of the echo signal. It follows, therefore, that such sensors, by an almost trivial modification thereto, may be used to provide both speed and height information.

Figure 4:
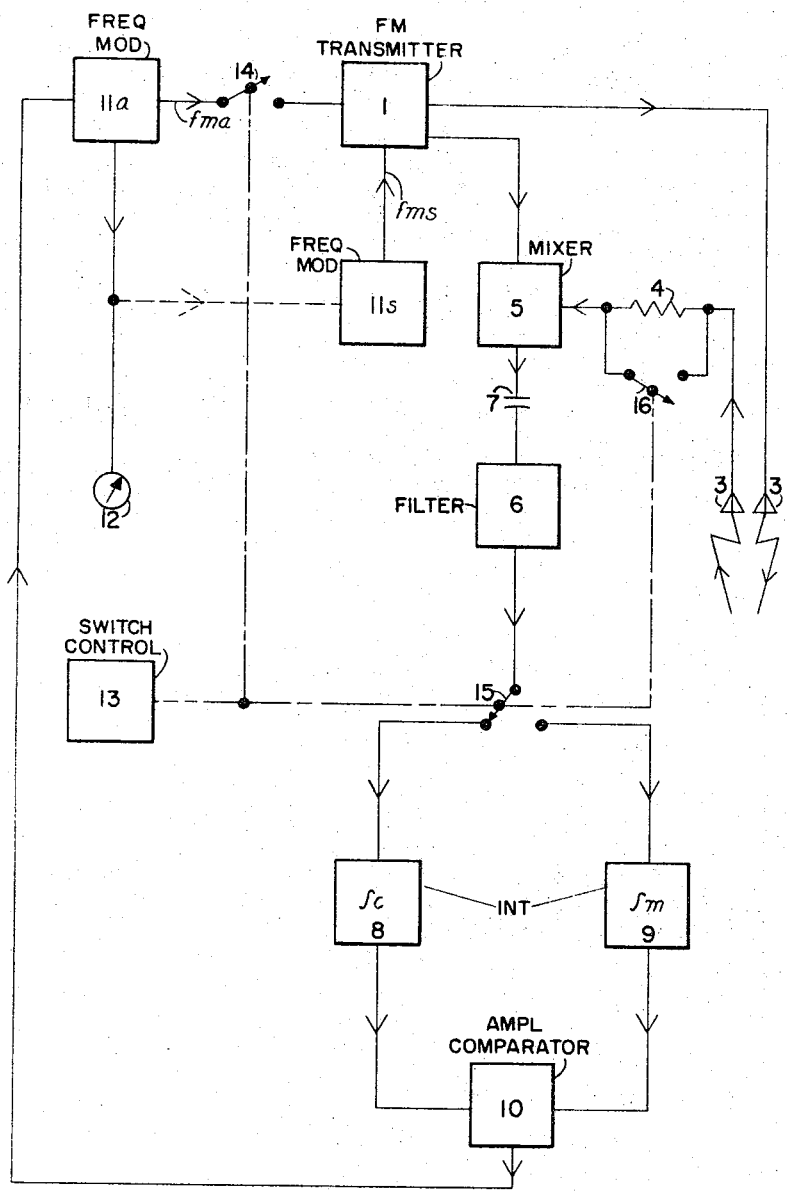
FIGURE 4 shows an embodiment of the invention using double frequency modulation.

Referring to FIGURE 4 there is shown an embodiment of the invention employing double frequency modulation and which, in block diagram form, differs from that of FIGURE 2 only in the provision of two frequency modulators labelled 11a and 11s of which 11s operates continuously upon the transmitter. The frequency of modulation, $f_{ma}$, of modulator 11a is selected, as before, on the basis of maximum operating altitude, say between 10 and 20 kilocycles per second for heights up to 10,000 feet. The frequency $f_{ms}$ of modulator 11s, however, is selected in accordance with the known sideband selecting FM/CW Doppler radar technique of noise reduction whereby a predetermined frequency modulation sideband component is displaced from the carrier in the frequency spectrum beyond any noise modulation components of significant amplitude. The frequency of $f_{ms}$ may be in the hundreds of kilocycles per second range or even higher. The frequency deviation produced by modulator 11s may be constant or, as will be discussed later, may be adjusted as a function of height.

In accordance with the known sideband selecting FM/CW noise reduction technique the filter 6 is designed to accept echo signals associated with that $f_{ms}$ frequency modulation sideband component having the particular distance versus signal amplitude characteristic best suited to the operational requirements of the system. While any sideband from $J_1$ up may be used, in a number of applications the third order sideband is representative of practical usage so that the nominal frequency of filter 6 may then be $3f_{ms}$. A further consideration for filter 6 must be met, namely, that it respond only to the $J_0$ component of the altitude frequency modulation signal borne by the selected sideband and exclude altitude frequency modulation sideband components. To illustrate, the filter system, 6, centered on $3f_{ms}$ would have a bandwidth such as to reject signals of $3f_{ms} \pm f_{ma}$ and beyond whereby the $J_1$ and higher order sidebands are excluded. The filter system 6 may take the form of an IF amplifier and, if the range of Doppler frequency shifts borne by the echo so demands, may incorporate Doppler frequency tracking means such as used in Doppler radar groundspeed sensors.

As noted above the mode of operation and adjustment under modulation by modulator 11s, namely the selection of a high modulation frequency and the use of a sideband such as $J_3$ enables a great gain to be made in signal to noise ratio, the high modulation frequency of 11s placing the desired signal in the frequency spectrum beyond noise modulation components, and the low response to leakage signals and echoes may from very close in targets due to the amplitude versus distance characteristic of the chosen $J_3$ sideband providing a further great reduction in noise.

It is to be noted that with the operation of this embodiment of the invention as so far described, namely, with modulator 11s applying a fixed modulation index to the transmitter, there will be a range of heights below which the use of a sideband such as $J_3$ results in a very low response, though counteracted, of course, by the increase due to the inverse square law of distance. However, due to the high modulation frequency of $f_{ms}$ this range of low response is not large, and the signal amplitude increases at a much more rapid rate, with increase of altitude than when a low modulating frequency such as the height limited frequency of $f_{ma}$ is used. The result is that there will be a range of relatively low heights over which the signal to noise ratio is near its maximum. In certain aircraft operations, one of which is the transition between forward flight and landing operations of helicopters, there is a range of low heights which are of particular concern. For such operations the abovedescribed embodiment of the invention is particularly well adapted whereby the appropriate selection of modulating frequency $f_{ms}$ and sideband order the performance in a chosen range may be enhanced.

It will be further noted, however, by reference to FIGURE 4 that the height information supplied by the system to indicating means 12 is also available, as shown by the dashed line, for control of the deviation applied by frequency modulator 11s. Thus it is possible to track the deviation applied by modulator 11s, precisely as is done in the prior art system tracking on the peak response of $J_2$. Practically, of course, difficulty in obtaining the theoretically desirable magnitude of deviation at low heights may limit the complete attainment of this objective. However, in the present invention there is no requirement, as in the abovenoted prior art system, for accuracy of deviation tracking where such is *the* measure of height, and maintenance of near-optimum signal to noise level to a very significant extent is attained in the embodiment of FIGURE 4 of the present invention by only partial realization of tracking on the peak response of the sideband signal.

It will be evident, of course, to those skilled in the art of sideband selecting FM/CW navigational radars that in operation the embodiment of the invention shown in FIGURE 4, if it is to operate over an extensive range of heights, will encounter the problem of "altitude holes," that is, the reduction of signal amplitude, theoretically to zero, at those heights at which the round trip time of a signal of frequency $f_{ms}$ is such that the returned echo signal is in phase with the transmitted signal. However, it is evident that the height modulation, $f_{ma}$ from modulator 11a is applied in accordance with the effect thereof upon the $J_0$ component of the echo signal, and it follows that how said component is obtained is not involved in the basis of measurement. Thus in general, techniques well known to meet the problem of "altitude holes" in FM/CW groundspeed measuring radars may be applied to the embodiment of FIGURE 4 without affecting the functioning of the height finding process. For example, the frequency $f_{ms}$ may be varied a relatively small amount such that the filter 6 is capable of accepting the limiting frequencies thereof, or two or more distinct sub-harmonics of the frequency of filter 6 may be used whereby the said filter provides an output derived from one or other of two or more sideband components as for example $J_3$ and $J_5$.

Figure 5:
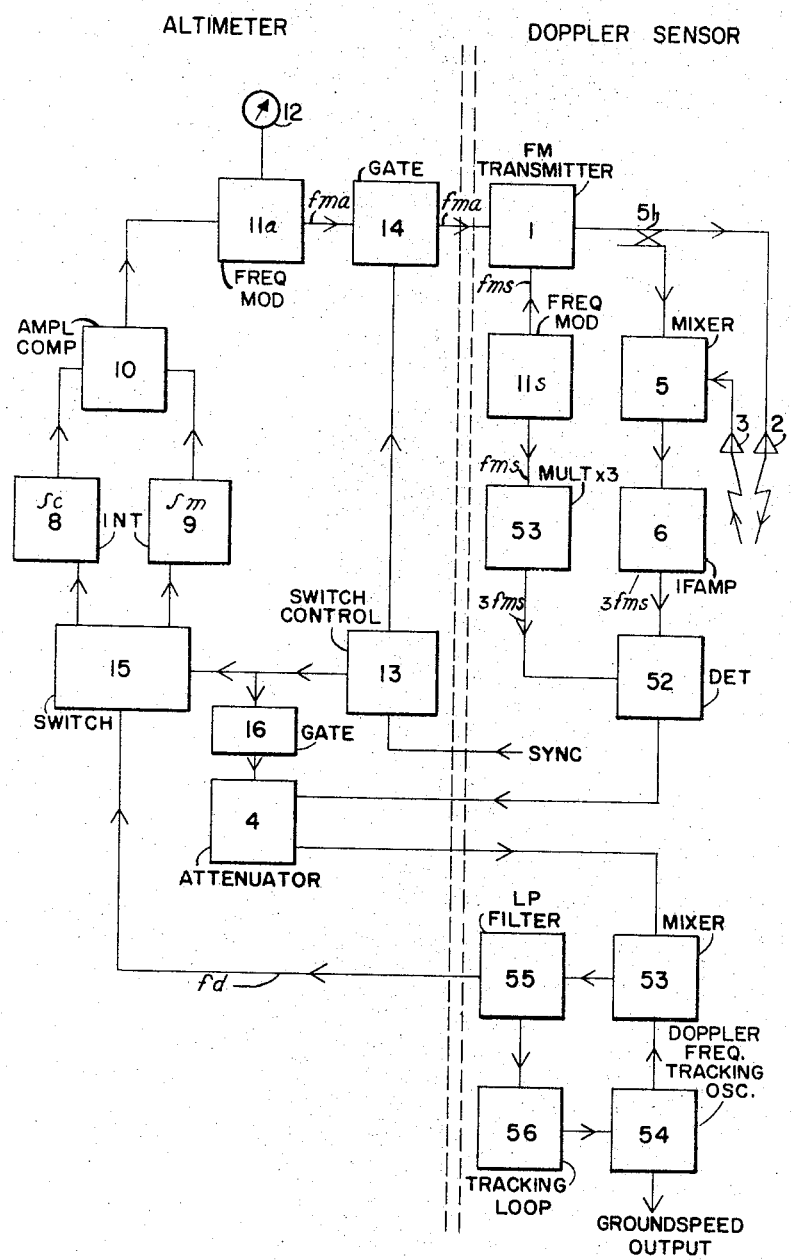
FIGURE 5 shows how the invention may be integrated with a known type of Doppler groundspeed sensor.

In FIGURE 5 is shown how the invention as exemplified by the embodiment of FIGURE 4 may be integrated with a known type of Doppler groundspeed sensor of the sideband selecting FM/CW type. Like or equivalent components of FIGURES 4 and 5 bear the same numerical identification. To the right of the dashed double line in FIGURE 5 is shown in simplified form the known Doppler sensor; to the left, those additions whereby in accordance with the invention altimeter or terrain clearance facilities may be added thereto.

In FIGURE 5 the usual FM transmitter 1, frequency modulated at the rate $f_{ms}$ by modulator 11s delivers a signal to the aerial system 2, 3 which in turn applies the echo signal returned from the earth's surface to the first mixer 5 where it is mixed with signals derived directly from the transmitter by coupler 51. As is well known the signal derived directly from the transmitter may be shifted or offset in frequency to enable a determination of the sense of the velocity vector for helicopter use with a concomitant modification of subsequent frequency selection processes, but for illustrative purposes FIGURE 5 is shown as being the more simple type applicable to the usual fixed wing aircraft. From the products of mixer 5 filter 6, shown as being an IF amplifier, selects a predetermined sideband component, namely the third or $J_3$ shown as being representative. The signal from IF amplifier 6 is mixed in detector 52 with a signal of frequency $3f_{ms}$ produced by the multiplier 53 acting on the modulating signal of frequency modulator 11s. The echo signal delivered by the detector 52 after passing through the switched attenuator 4 is fed into the usual Doppler frequency tracking system of the Doppler sensor here shown in elemental form as mixer 53 fed also from the Doppler frequency tracking oscillator 54, a low pass filter 55 and tracking loop circuitry 56. The output from filter 55 is then applied as the $J_0$ component of the echo signal to the altimetry circuitry described above with reference to FIGURE 4. The beam switching operations normal to the Doppler sensor operation serve as a source of synchronizing signals for the switch control 13 of the altimeter. As illustrative of use in practice the switching functions of the elements 14 and 16 of FIGURE 4 are illustrated in FIGURE 5 as electronic gates.

It will be noted that in FIGURE 5 the attenuator 4, instead of being placed before mixer 5 as previously shown, is now found after the detector 52. It will be realized that since the function of attenuator 4 is simply to act upon the desired component of the echo signal or its derivative, it may be placed anywhere in the path of that signal.

It might be further noted that within the concept of the invention the function of the attenuator 4 may be performed at any point in the unmodulated echo signal path between earth and the output of the amplitude comparator 10. Thus it could be placed before, after, or made a part of integrator 8, or amplitude comparator 10 could be so set up as to provide its null indicating signal, not for equality of inputs, but for the appropriate ratio of inputs. The placement of attenuator 4 in FIGURE 5 serves to illustrate how minor may be the modification to an existing Doppler sensor to provide a complete altimeter facility—using standard present day techniques, the addition of a circuit board module of some 5" x 5" x ¾" weighing less than 1 pound. Equally well, of course, the attenuator 4 could be made part of the IF amplifier 6, or could be a microwave component in the line from the receiving aerial to the first mixer as shown in the previous figures.

It might be noted that the application of the invention is not confined to continuous wave radar systems but can be used also in pulsed systems. Thus in a pulsed radar, if a carrier frequency component of the echo signal is selected, by also frequency modulating the pulses the energy in said carrier frequency component may be dispersed into sidebands whereby a predetermined effective frequency modulation index indicative of range in accordance with the foregoing teaching may be achieved. Since, of course, a main consideration in pulsed systems is to be able to examine the echo signal, or at least a part thereof, in the absence of the transmitted signal, a technique such as the coherent oscillator technique used in MTI (moving target indicating systems), or the gated continuous wave technique is needed to determine the effective frequency modulation index of the echo signal by comparing it with the transmitter signal. It will be realized, however, that even as applied to a pulsed system, the invention uses the sideband selecting FM/CW type of operation, the selected sideband still being the carrier frequency or $J_0$ component of the echo signal.

I claim:

1. A radar terrain clearance meter of the frequency modulated continuous wave type comprising a transmitter adapted to be frequency modulated, and an aerial system adapted to direct signals from said transmitter to the earth's surface and to receive echo signals therefrom, wherein said earth's returned echo signals, frequency shifted due to the Doppler effect, are applied to a mixer means together with signals derived internally of the apparatus from the transmitter to produce in said mixer an output signal which is expressible in the terms of a Bessel function of the first kind and having $n$ order frequency components where $n=0, 1, 2, 3, \ldots$, and further comprising adjustable means for applying an altitude frequency modulation signal to said transmitter to provide an adjustable modulation index by adjustment of the frequency deviation of said transmitter signal frequency, the modulating frequency being of such a magnitude that even at the highest operating speeds, the Doppler shift, associated with the zero order component, is less than the first order component frequency, means for frequency selecting from the output of the mixer the zero order frequency component of said mixer output signal, means actuated by the output signal of said frequency selecting means, for adjusting the value of said modulation index to that value whereat the amplitude of said zero order component falls to a predetermined level relative to the amplitude thereof under conditions of no applied altitude frequency modulation, and means for indicating the adjusted modulation index in terms of distance, characterized in that said predetermined level is not less than 60% of the value of the zero order component under conditions of no applied altitude frequency modulation.

2. A meter as defined in claim 1 and further characterized in that means, connected to the output of said frequency selecting means, are provided for alternately measuring the amplitude of said zero order component under conditions of no applied altitude frequency modulation, and for measuring the amplitude of said zero order component with altitude frequency modulation applied and means for comparing said amplitude, and wherein said means to adjust the value of modulation index is actuated by the output of said comparator means and effects such deviation of the transmitter signal frequency as to reduce said modulated zero order component amplitude by a predetermined percentage which is not less than the 60% of the zero order component under conditions of no modulation.

3. A meter as defined in claim 2 and further characterized in that, in addition to said altitude frequency modulation means, means are provided to continuously modulate said transmitter whereby to place said selected zero order component at a place in the frequency spectrum which is substantially free of noise modulation components in the output of said mixer.

4. A meter as defined in claim 3 further characterized in that said further modulation means is amplitude modulation means.

5. A radar terrain clearance meter comprising, a transmitter adapted to be frequency modulated, an aerial system adapted to direct signals from said transmitter to the earth's surface and to receive echo signals, frequency shifted due to the Doppler effect, therefrom, first adjustable frequency modulator means adapted to produce from said transmitter a frequency modulated signal adjustable in frequency deviation, the modulating frequency of said modulator means being of such a magnitude that, even at the highest operating speeds, the Doppler shift associated with the zero order component is less than the first order component frequency, means for mixing echo signals with signals derived internally of the apparatus from said transmitter, filter means coupled to the output of said mixer means, wherein said mixer means produces an output signal which is expressible in the terms of a Bessel function of the first kind and having $n$ order frequency components where $n=0, 1, 2, 3, \ldots$, and wherein said filter means is AC coupled to the output of said mixer means and has a pass band which will pass the zero order frequency component of said mixer output and will block the first and higher order frequency components of said mixer output, characterized in that means are provided for alternately connecting and disconnecting said modulator means to said transmitter to alternately provide a modulated and unmodulated carrier signal, and in that means are provided for attenuating the unmodulated carrier with attenuator means having a predetermined insertion loss of no more than 60%, and in that means are provided for comparing the amplitude of the echo signal of the attenuated unmodulated carrier with the amplitude of the echo signal of the modulated carrier, and further provided with means responsive to the comparator means output to adjust the frequency deviation effected by said modulator means upon said transmitter signal so as to achieve a null output from said comparator means, and provided with means for indicating the frequency deviation in terms of height.

6. A meter as defined in claim 5 and further provided with a pair of signal integrators switchable alternately to the output of said filter system, each integrator adapted to provide a response representative of the amplitude of the signal fed thereto, and wherein said means for alternately connecting and disconnecting said modulator means comprises two position switching means adapted in the first position thereof to disconnect the output of said frequency modulating means from said transmitter and to connect the output of said filter to the first of said integrators and in the second position thereof to apply the output of said frequency modulation means to said transmitter and to connect the output of said filter to the second of said integrators, said attenuator means being switchable with the first position of operation of said switching means to be in the then echo signal path terminating at the output of said amplitude comparator means.

7. A meter as defined in claim 6 wherein said amplitude comparator is fed from said pair of integrators and is adapted to provide a null response indicative of the equality of the two inputs thereto.

8. A meter as defined in claim 7 and further characterized in that, in addition to said first frequency modulating mean, means are provided to continuously modulate said transmitter whereby to place said selected zero order component at a place in the frequency spectrum which is substantially free of noise modulation components in the output of said mixer.

9. A meter as defined in claim 8 and further characterized in that said further modulation means is amplitude modulation means.

References Cited
UNITED STATES PATENTS

| | | | |
|---|---|---|---|
| 3,112,481 | 11/1963 | Goldberg | 343—14 |
| 3,188,635 | 6/1965 | Blythe | 343—14 |
| 3,214,756 | 10/1965 | Goldberg | 343—14 |
| 3,217,322 | 11/1965 | Kabell et al. | 343—14 |
| 3,239,837 | 3/1966 | Fried | 343—14 X |

RODNEY D. BENNETT, *Primary Examiner.*

CHESTER L. JUSTUS, *Examiner.*

J. P. MORRIS, *Assistant Examiner.*